UNITED STATES PATENT OFFICE.

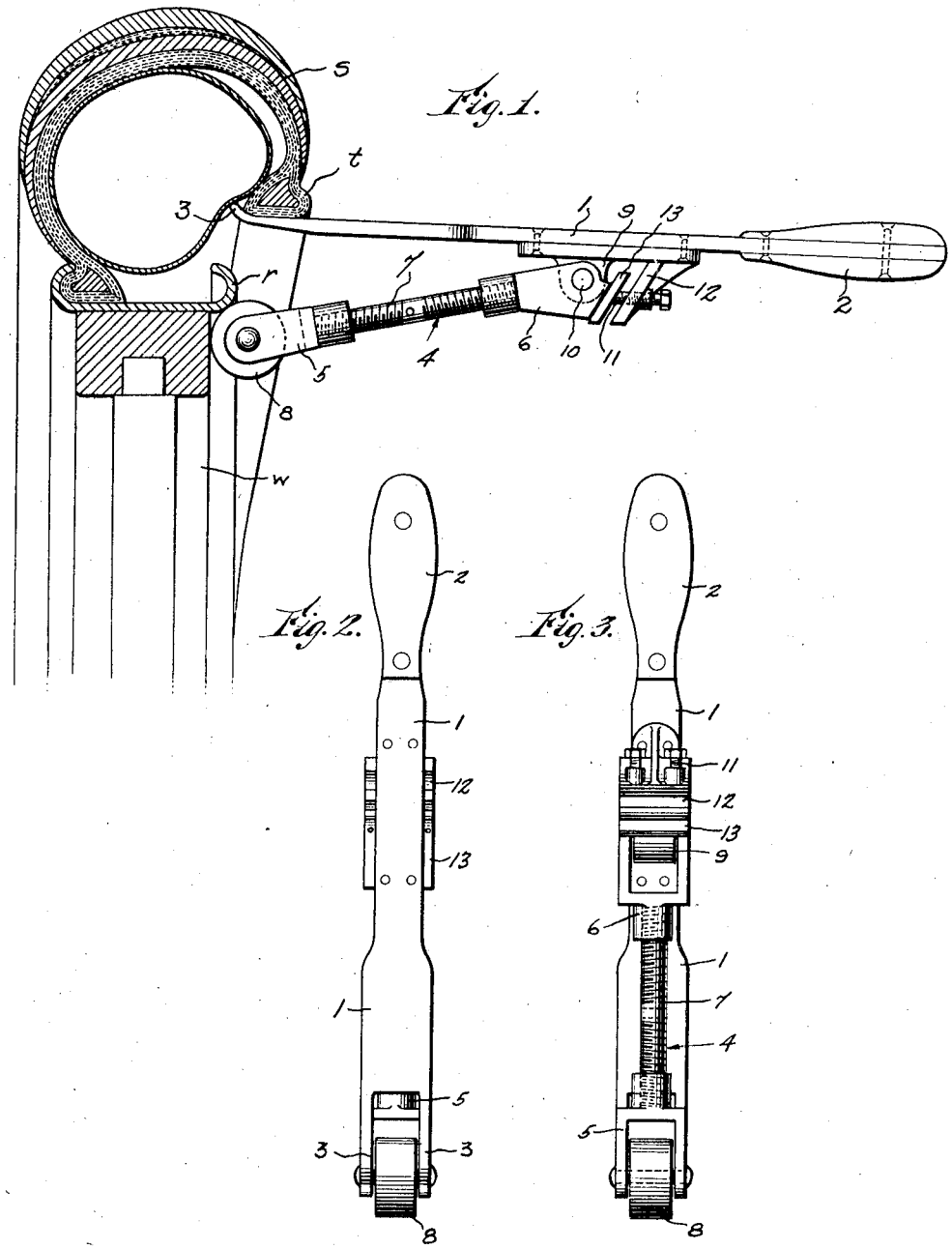

CHRISTIAN C. F. REININGER, OF NEW YORK, N. Y.

TIRE-REMOVING TOOL.

1,332,191.    Specification of Letters Patent.    Patented Feb. 24, 1920.

Application filed September 5, 1918. Serial No. 252,731.

*To all whom it may concern:*

Be it known that I, CHRISTIAN C. F. REININGER, a citizen of the United States, and a resident of the city of New York, Springfield Gardens, borough of Queens, in the county of Queens and State of New York, have invented a new and Improved Tire-Removing Tool, of which the following is a full, clear, and exact description.

Among the principal objects which the present invention has in view are: to lift the bead of a tire shoe from engagement with the tire rim with which a wheel is provided, and to move the disengaged bead portion laterally from said rim for avoiding the accidental return of the bead to its engaged relation with said rim; to avoid marring the finish of the wheel rim and the felly: and to adjust the tool to time the pulling operation by which the bead is moved laterally out of line with the rim.

With such and other objects in view, the invention comprises various novel features of construction and arrangement of parts which will be set forth with particularity in the following description and claim appended hereto.

In the accompanying drawing, which illustrates one embodiment of the invention and wherein similar characters of reference indicate corresponding parts in all the views, Figure 1 is a side view of the tool shown in the act of removing a tire;

Fig. 2 is a top plan view; and

Fig. 3 is a bottom plan view.

Heretofore tires have been removed with the aid of what is known as a tire iron. The tire iron has a relatively thin narrow spoon-shaped end, which may be forced between the inner surface of the wheel rim and the outer surface of the tire bead. Using the tire rim as a fulcrum, the iron has been forced outward and toward the center of the wheel, with the effect that the end of the tire iron has extended below the bottom of the bead of the tire. Continuing the action, the end of the tire iron is supposed to pass to the inner side of the bead, so that when the tire iron is rocked to its full extent, the bead has been pried from the channel of the rim and to one side thereof. The distance to which it is moved laterally is necessarily limited to the thickness of the iron.

To increase the distance of the lateral displacement of the bead, many of the usual tire irons have been provided with a web extension which in effect increases the thickness of said tire irons and concomitantly increases the lateral displacement of the bead. A difficulty which has existed has been that the initial elevation of the bead has been insufficient to affect any large area of the bead.

It is to overcome the various objections referred to that the present invention provides a brace member which is moved into service relation to the wheel felly or rim when the iron has disengaged the tire bead from said rim, said brace thereafter functioning as a fulcrum to radially lift and laterally pull the bead from the said rim.

Referring to the drawing 1 designates the tire iron which has a handle 2 at one end. The opposite end is formed with curved members or tines 3 which are adapted to be inserted under the bead $t$ of the tire shoe $s$, so as to pry the same from the rim $r$ of the felly $w$. A brace 4 is connected with the tire iron 1 so that it may be supported while removing the tire. The brace 4 has heads 5 and 6 and a right and left hand screw element 7, whereby said brace may be lengthened or shortened. In the head 5 is a roller 8 adapted for bearing against the rim or felly of the wheel. A lug 9 carried by the tire iron is pivotally connected by a pin 10 with the head 6. The swinging movement of the tire iron about the pin 10 is limited by set-screws 11 mounted in a lug 12 on the tire iron. An abutment 13 is associated with the head 6, such abutment being adapted to act as a stop when engaged by the underside of the iron 1.

In use the curved end of the tire iron is engaged between the bead of the tire and the rim of the wheel. The handle end is swung laterally and toward the center of the wheel, and in so doing the wheel 8 engages the side of the wheel felly. Further movement of the tire iron draws the tines 3 and bead supported thereby laterally to disengage the tire bead from the rim, as shown in Fig. 1.

By using the wheel 8, any marring of the felly and rim of the wheel is avoided. In service, the wheel rests on two points bridging the angle between the rim $r$ and the felly $w$ of the wheel. This rest steadies the wheel, preventing the same rolling as the brace is rotated on its pin. The screw 7 is manipulated to adapt the tool to wheels and to rims of different makes, a greater extension being required in certain cases. The screws 11 are adjusted to regulate the disposition of the tire iron 1 relative to the said brace, and to the rim of the wheel.

I claim:

A device of the class described comprising a tire iron, a brace pivotally connected therewith, said brace embodying adjustably connected members for varying the brace lengthwise, a roller on the free end of the brace, and adjustable stop means between said brace and said iron for limiting the movement of the latter with respect to the former.

CHRISTIAN C. F. REININGER.